UNITED STATES PATENT OFFICE.

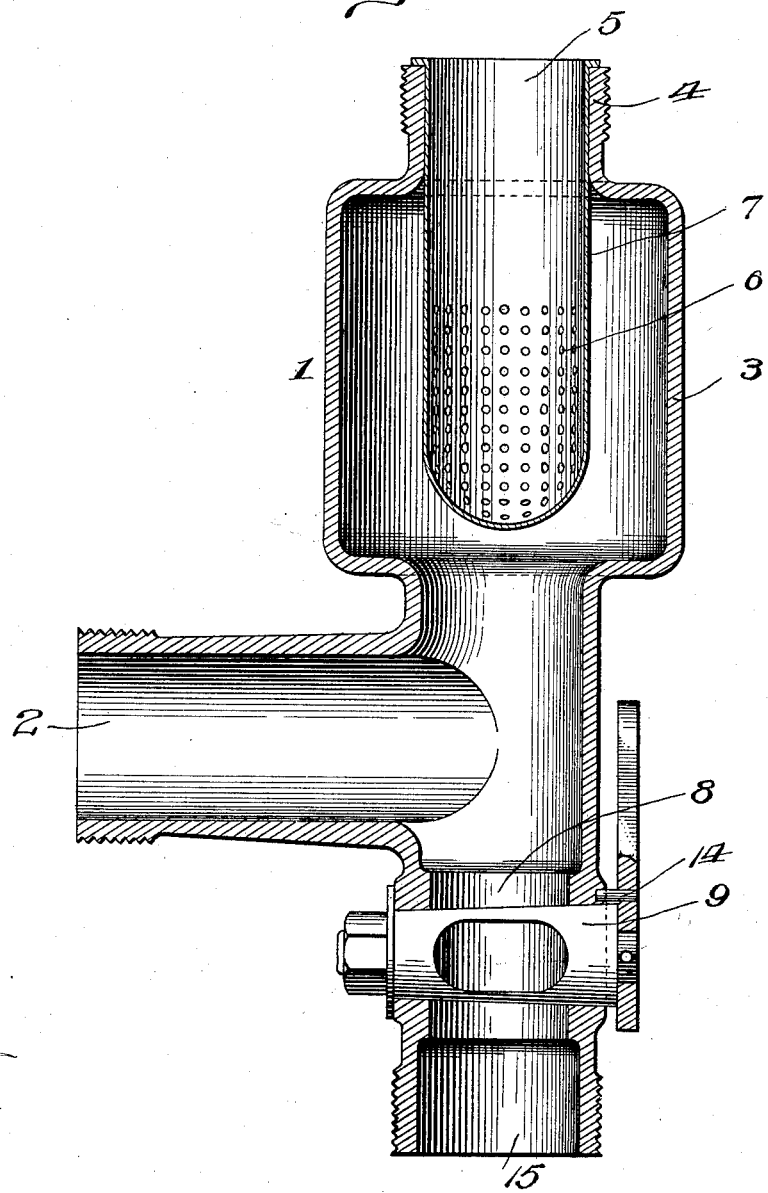

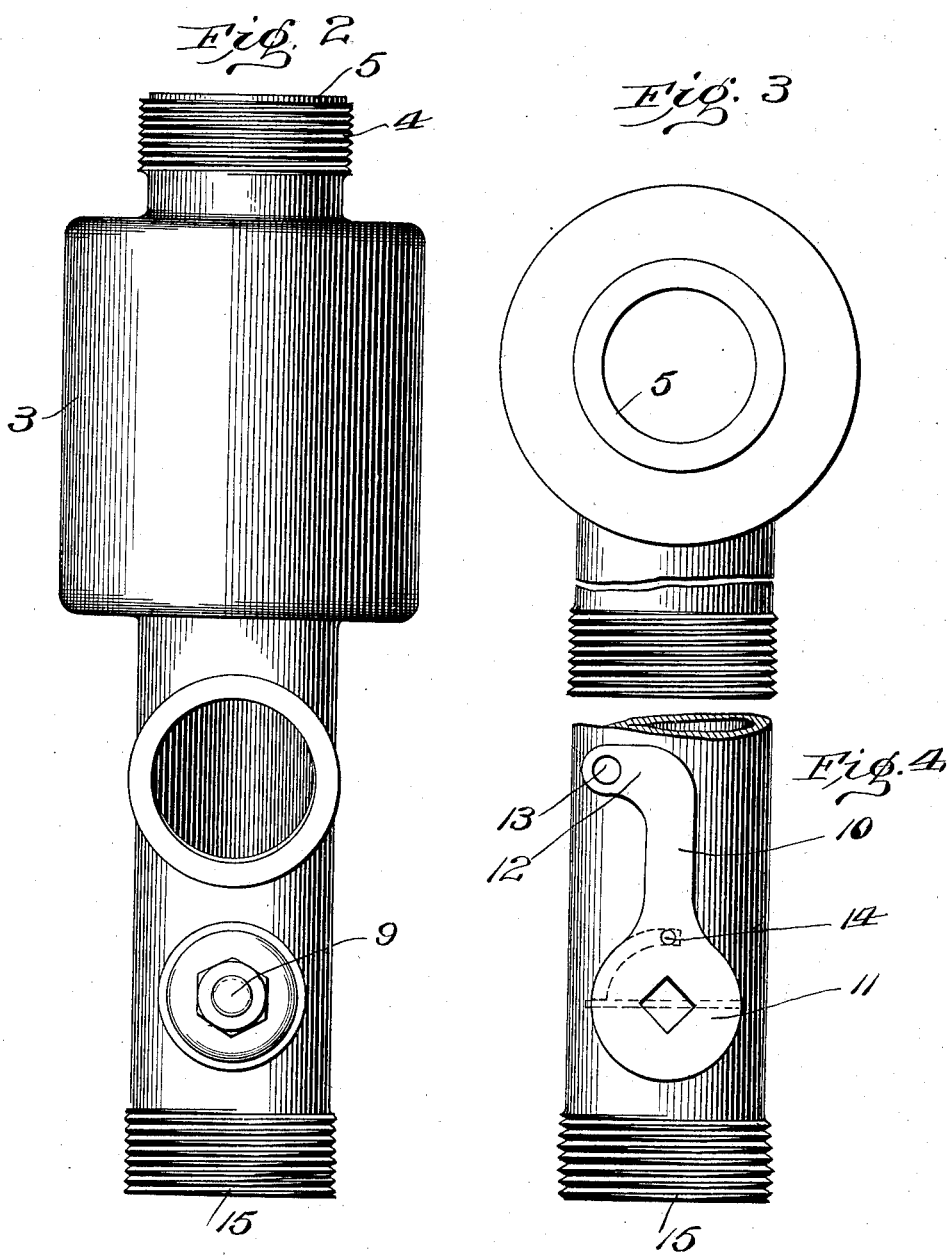

ROBERT B. PAXTON, OF CLIFTON FORGE, VIRGINIA.

LOCOMOTIVE FEED-WATER STRAINER.

SPECIFICATION forming part of Letters Patent No. 655,795, dated August 14, 1900.

Application filed January 31, 1900. Serial No. 3,393. (No model.)

*To all whom it may concern:*

Be it known that I, ROBERT B. PAXTON, a citizen of the United States, and a resident of Clifton Forge, in the county of Alleghany and State of Virginia, have invented certain new and useful Improvements in Locomotive Feed-Water Strainers, of which the following is a specification.

My invention relates to a device to be interposed in the feed-water pipe of an engine for the purpose of separating foreign matter from the water which is introduced into the steam-boiler and trapping the same at a point where it may be blown off at will by opening a valve and permitting a reverse flow of water or steam through the device.

My invention consists in certain novel features of construction to be hereinafter fully described, and particularly pointed out in the claims, reference being had to the accompanying drawings, in which—

Figure 1 is a vertical central section through the device constructed in accordance with my invention. Fig. 2 is an elevation thereof viewed in a direction at right angles to Fig. 1. Fig. 3 is a plan and Fig. 4 is a detail view of the valve-operating lever.

Devices of this character as heretofore constructed have been unsatisfactory in that the shape and location of the strainer and of the surrounding shell have been such that foreign substances would settle beneath the shell and pack around the same in a manner to gradually diminish the flow of water, while the reverse flow of water or steam for blowing out the accumulation could not satisfactorily effect the removal thereof. To obviate these difficulties, I provide a shell in vertical position formed with a lateral inlet 2, a cylindrical expanding-chamber 3 above the water-inlet, and an outlet-neck 4 above the expanding-chamber, in which is fitted a strainer 5, that projects downward into the chamber 3, so as to leave ample space around the projecting portion of said strainer. The strainer is provided for a portion of its length with apertures 6 and with a tight or non-perforate portion 7 above said apertures, while below the lateral inlet 2 and vertically beneath the chamber 3 is a settling-chamber or trap 8, the bottom of which is formed by a valve 9. When water passes through the inlet 2 and up into the chamber 3 under the influence of the suction of the injector, foreign substances are arrested by the strainer, and they gravitate to the settling-chamber or trap 8. The non-perforate portion 7 above the perforate portion 6 of the strainer forms a dead space, at which there is little or no motion of the water, and this avoids any tendency of the foreign substances to pack in the upper end of the chamber, as might be the case if the strainer were perforated throughout its length. Moreover, the ample space existing between the outer surface of the strainer and the inner wall of the expanding-chamber 3 precludes any possibility of the material packing in the chamber. Any material that settles in the chamber 8 is below and out of the flow of water and is not thereafter disturbed by subsequent passage of water through the device. Periodically the valve 9 will be opened and the reverse flow of water or steam, as the case may be, will be set up through the outlet 4 back through the strainer and past the valve 9, so that any accumulation in the settling-chamber 8 will be blown off. For convenience in manipulating the valve 9 I provide the latter with a flat lever 10, suitably fitted to the plug of the valve 9 and secured thereto in any suitable manner—as, for instance, by a through-pin 11. The lever 10 may be provided with a lateral offset 12, formed with an eye 13, which is to one side of the center of the valve-plug 9, so that the valve may readily be opened through the medium of the rod extending upward to the running-board or cab when the device is used on a locomotive, or the lever is adapted by the offset 12 and eye 13 for convenient attachment to an operating pull or handle.

14 represents a limiting-pin introduced through the face of the lever 10 in a direction parallel to the axis of the valve-plug and working in a segmental slot in the valve-shell for the purpose of limiting the motion of the valve in the usual way. By introducing the plug in the manner shown axial adjustment of the valve-plug 9 to compensate for wear will not be interfered with, as the pin 14 may be adjusted or filed away as the plug is set up.

The blow-off outlet 15 is provided with threads 16 in order that it may serve as a convenient means of attaching a hose for supplying feed-water to the locomotive from any convenient source before firing, the valve 9 providing a convenient means for controlling the introduction of water through this passage, or if in the case of the locomotive the tender contains water and there is pressure in the air-tank on the locomotive the brake-pipe may be applied to the threaded outlet 15 and by the use of air-pressure introduced at this point and transversely across the intersection of the water-inlet 2 an injector is improvised which will force water from the tender into the locomotive.

Having thus described my invention, the following is what I claim as new therein and desire to secure by Letters Patent:

1. A feed-water strainer comprising a vertical shell formed with a transverse water-inlet, a cylindrical expanding-chamber above the water-inlet, a settling-chamber below the water-inlet vertically beneath the expanding-chamber, and a reduced outlet-neck vertically above the expanding-chamber, a vertical strainer introduced through the outlet-neck into the expanding-chamber and having the lower portion of its surface perforated so as to leave an imperforate portion in the upper part of the expanding-chamber, and a valve forming the bottom of the settling-chamber; substantially as set forth.

2. A feed-water strainer comprising in one casting, a lateral inlet, cylindrical expanding-chamber above and at right angles to the inlet, the outlet of the expanding-chamber being of the same diameter as the said inlet, a settling-chamber at right angles to and below the said inlet of a valve-plug forming the bottom of the settling-chamber and a perforated strainer secured in the outlet of and projecting into the center of the expanding-chamber, said strainer being of the same diameter as the said inlet and outlet.

ROBERT B. PAXTON.

Witnesses:
J. H. HOUSMAN,
C. F. JORDAN.